United States Patent Office 2,906,856
Patented Sept. 29, 1959

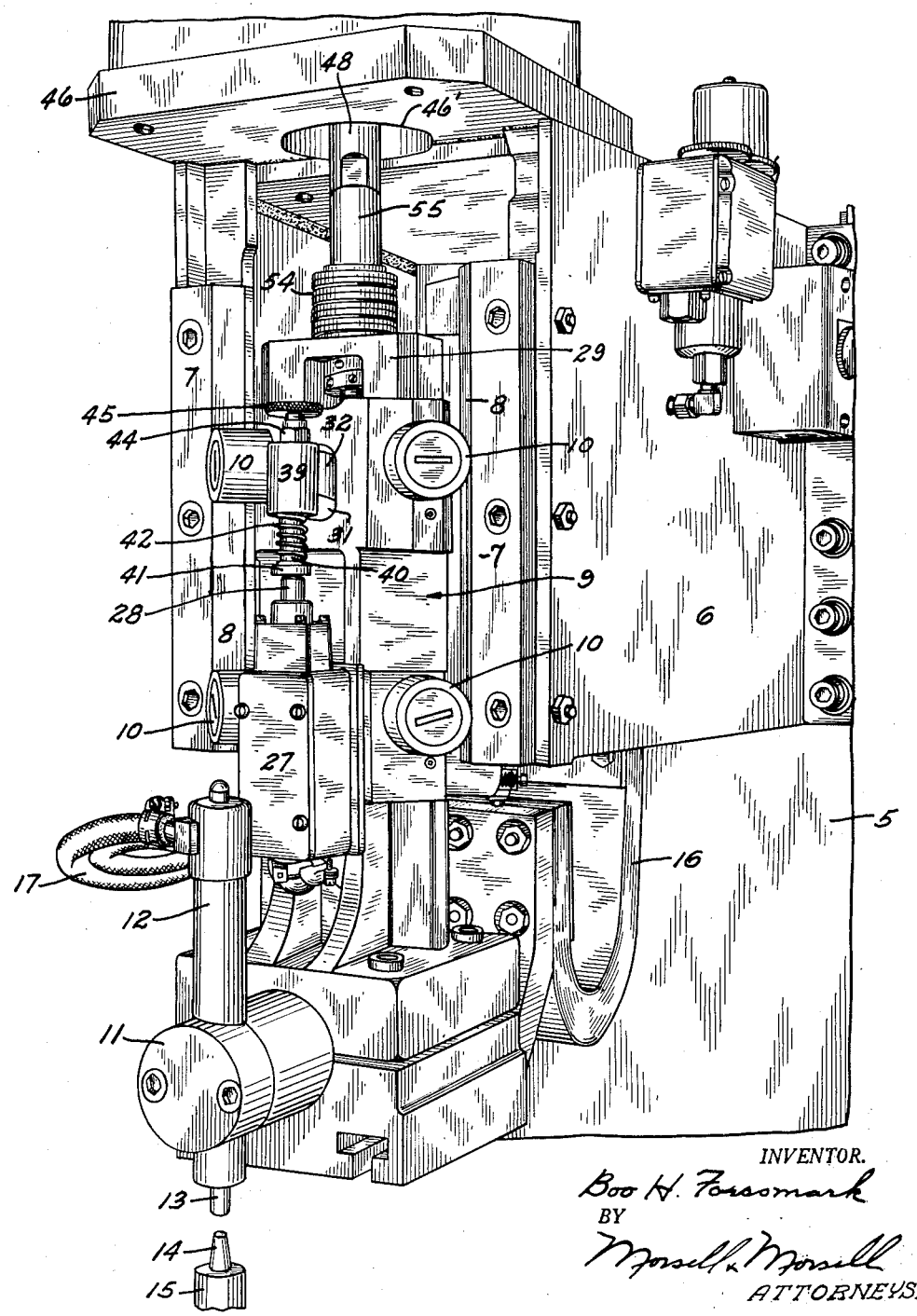

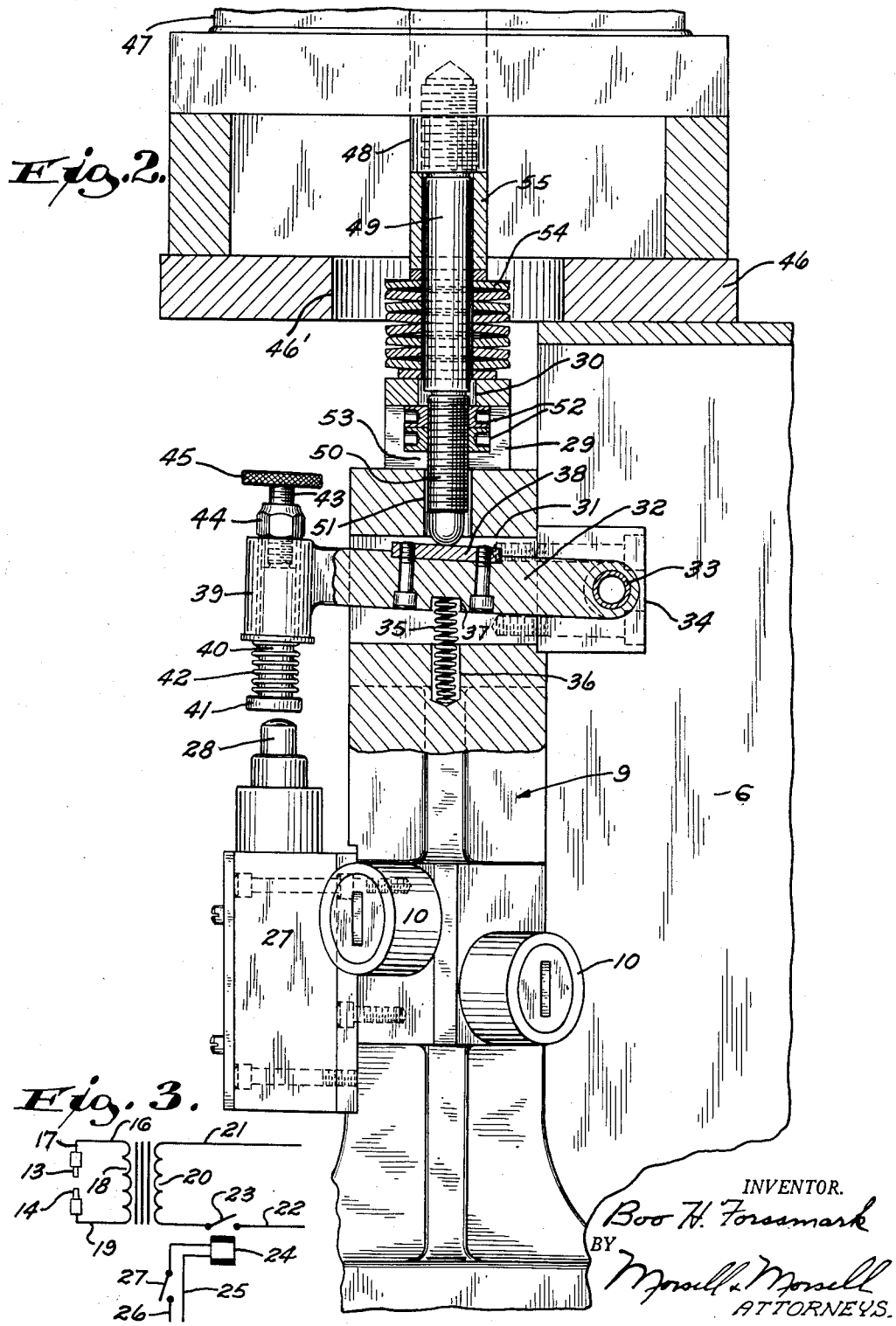

2,906,856

ELECTRIC RESISTANCE WELDERS WITH DEFLECTION FIRING HEADS

Boo H. Forssmark, Menomonee Falls, Wis., assignor to Banner Welder, Inc., Milwaukee, Wis., a corporation of Wisconsin Application February 13, 1959, Serial No. 793,103

10 Claims. (Cl. 219—89)

This invention relates to improvements in electric resistance welders with deflection firing heads.

In the operation of electric resistance welders it is important ot bring about firing at a predetermined point in the pressure curve and to have a pressure follow-through which takes place immediately upon firing. Heretofore in deflection firing heads where a switch has been operated as a result of movement of the welding ram, the movement of the parts which caused switch closing was at the same speed as the rest of the ram. With the present invention a switch actuating lever not only moves with the welding ram, but also is mounted on the ram for independent pivotal movement in such a way that there is a 2-to-1 ratio of switch reaction to deflection of the energy storing spring. As a result of this arrangement a faster action is obtained and the device can be made more sensitive, for better performance when welding with sensitive materials such as aluminum and magnesium.

A further object of the invention is to provide a device as above described wherein the switch actuating member is adjustable to bring about firing at a predetermined point in the pressure curve, depending upon conditions and material.

A more specific object of the invention is to provide, in a resistance welder having a vertically movable welding ram, a switch actuating lever arm extending transversely of said ram and independently pivotally mounted thereon so that the lever arm can be caused to move independently of the ram to bring about a faster switch action and to cause firing to take place at a predetermined point on the pressure curve.

With the above and other objects in view, the invention consists of the improved electric resistance welder having a deflection firing head and all of its parts and combinations, as set forth in the claims, and all equivalents thereof.

In the accompanying drawings, illustrating one complete embodiment of the preferred form of the invention, in which the same reference numerals designate the same parts in all of the views:

Fig. 1 is a fragmentary perspective view of a resistance welder having a deflection firing head equipped with the novel features of the present invention;

Fig. 2 is a fragmentary vertical sectional view through the welding ram and associated parts, the lower portion of the ram being shown in full; and Fig. 3 is a wiring diagram.

Referring more particularly to the drawings, the machine includes a suitable upright frame member 5 having spaced plates 6 projecting laterally from its upper end. The forward edges of the plates support vertical guide rails 7 having roller tracks 8. A welding ram 9 has rollers 10 thereon which are so positioned as to co-act with the tracks 8 in guiding the ram for vertical movement. The welding ram carries a support 11 for a vertically disposed electrode 12, the latter having a welding point 13 at its lower end which is adapted to co-act with the point 14 of a lower electrode 15. The latter is suitably supported in fixed position on a lower part of the frame portion 5.

Current is brought into the upper electrode through a flexible laminated lead-conductor 16 and through a cable 17. The lead 16 extends from the secondary 18 of a transformer as shown in the diagram of Fig. 3, the other side of the secondary being connected by a conductor 19 with the lower electrode 14. The primary 20 of the transformer is wired to a suitable source of current by means of the wires 21 and 22, such current being usually a 220-volt source. Interposed in the line 22 is a switch 23 which may be actuated by a solenoid 24 or in any other manner. The leads 25 and 26 from the solenoid 24 extend from a suitable source of electricity, and there is interposed in the line 26 a microswitch 27. The microswitch 27 is shown in Fig. 1, and is a well-known item having a vertically movable operating button 28. The microswitch is mounted on the ram 9 for movement therewith.

Secured to the upper end of the welding ram 9 is an inverted U-shaped guide member 29 having a hole 30 in its top (see Fig. 2). Just below the upper end of the welding ram is a transverse opening 31 through which a lever arm 32 extends. The inner end of the lever arm is pivoted as at 33 between spaced ears 34 projecting from the backside of the welding ram. A coil spring 35 has its lower end seated in a recess 36 in the welding ram at the bottom of the lever arm recess and has its upper end seated in a recess 37 in the lower side of the arm 32. The upper side of the lever arm, intermediate its length, may have a wear plate 38 removably secured thereto. The outer end of the lever arm carries an upright sleeve 39 and there is a pin 40 slidably mounted in said sleeve. The lower end of the pin has a switch button contacting head 41 and there is a cushioning coil spring 42 interposed between the head 41 and the sleeve, which is designed to prevent damage to the switch 27. The upper end of the pin includes a threaded portion 43 of reduced diameter which extends upwardly beyond the upper end of the sleeve and is equipped with a lock nut 44 and with a knurled head 45. By manipulating the lock nut 44 and the knurled head 45, the amount which the pin projects downwardly may be varied. The contacting head 41 at the lower end of the pin is positioned to engage the push button 28 of the microswitch to actuate the latter when the lever arm 32 is in a lowered position.

Suitably supported on a horizontal platform 46 on top of the plates 6 is a suitable ram actuator such as a pressure-fluid cylinder 47, having a piston rod 48 depending from its piston. The cylinder 47 may be either pneumatic or hydraulic, of any well-known type, and it is adapted to cause fluid pressure actuated movement of the piston rod 48, both downwardly or upwardly. Tapped into the lower end of the piston rod 48 is a pin 49 which has a threaded lower end portion 50 of reduced diameter projecting through a hole 46' in the platform 46, through the hole 30 in the top of the U-member 29, and through a bore 51 in the upper end of the welding ram, the lower end of said bore 51 communicating with the transverse opening 31 and being just above the wear plate 38 so that the rounded tip of the pin 49 may engage said wear plate to actuate the lever arm 32. Threaded on the threaded portion 50 of the pin 49 are nuts 52 which may be adjusted in position, there being a clearance space 53 below the lowermost nut to allow for movement of the pin independently of the ram during deflection of the springs 54 as will be hereinafter explained.

Surrounding the pin 49 and supported on top of the U-member 29 is suitable energy storing spring means, preferably a stack of Belleville spring-washers 54. These spring-washers comprise pairs of opposed concavo-convex washers which are adapted to store energy when the stack is compressed. Pressure is transmitted to the washers by means of a spacer sleeve 55 surrounding the upper portion of the rod 49 and interposed between the top of the stack of Belleville washers and the lower end of the piston rod 48.

Operation

In operation, fluid under pressure is caused to enter the cylinder 47 to cause lowering of the piston rod 48 and lowering of the pin 49. The piston rod 48 acts through the sleve 55, Belleville washers 54 and U-member 29 to cause downward movement of the welding ram, which is guided by the rollers 10 on the tracks 8. This lowering continues until the upper welding point 13 (Fig. 1) engages work which is between said welding point and the welding point 14 of the lower electrode 15. Next, as downward movement of the piston rod 48 continues, the Belleville springs 54 are compressed and during compression of these spring-washers the lower end 50 of the pin 49 continues to move downwardly relative to the welding ram 9 in the hole 51 to cause downward pivoting of the outer end of the lever arm 32. This causes the actuating head 41 to operate the push button 28 of the microswitch 27 to fire the welding arc. At this same time the energy stored in the Belleville springs 54 gives the extra pressure to provide the necessary pressure follow-through as the welding is taking place.

During this latter part of the movement the upper nut 52 has moved downwardly somewhat away from the top of the U-member 29, such movement being permitted by the clearance space 53. On return movement of the piston rod 48 the upper one of the nuts 52 again engages the top of the U to move the welding ram back upwardly to the position of Fig. 2, the springs 54 having returned to their condition of Fig. 2.

It is apparent from the above that the use of the novel pin 50 and lever arm 32, which move with the welding ram and also independently thereof when the Belleville spring washers are being compressed, causes a speed-up in switch actuating movement. The mechanism makes it possible to have firing take place at a precise point in the pressure curve, depending upon requirements. This precise point may be varied by adjustment of the switch actuating pin 40 through the knurled head 45. Thus a much more sensitive device is made possible, and one which is suitable for use with sensitive materials such as aluminum and magnesium. In addition to the above, the device has the necessary pressure follow-through immediately after firing, due to energy stored in the springs 54.

Various changes and modifications may be made without departing from the spirit of the invention, and all of such changes are contemplated as may come within the scope of the claims.

What I claim is:

1. In an electric welder having a first electrode and having a movably mounted welding ram carrying a second electrode which is positioned to co-operate with said first electrode upon movement of the ram to a predetermined position, means including an electric circuit for firing said electrodes, a firing control switch in said circuit, a lever arm pivoted to said ram and having means positioned to actuate said switch upon pivotal movement of the lever arm relative to the ram, means including an actuator for moving said welding ram to a position where work is clamped between said first and second electrodes, said means including a resilient device between said actuator and ram responsive to further movement of said actuator beyond said clamping position for storing up energy, and means between said actuator and lever arm for moving the latter to switch actuating position during such further movement of the actuator.

2. In an electric welder having a first electrode and having a movably mounted welding ram carrying a second electrode which is positioned to co-operate with said first electrode upon movement of the ram to a predetermined position, means including an electric circuit for firing said electrodes, a firing control switch in said circuit mounted on said ram, a lever arm pivoted to said ram and having means positioned to actuate said switch upon pivotal movement of the lever arm relative to the ram, means including an actuator for moving said welding ram to a position where work is clamped between said first and second electrodes, said means including a resilient device between said actuator and ram responsive to further movement of said actuator beyond said clamping position for storing up energy, and means between said actuator and lever arm for moving the latter to switch actuating position during such further movement of the actuator.

3. In an electric welder having a first electrode and having a movably mounted upright welding ram carrying a second electrode which is positioned to co-operate with said first electrode upon movement of the ram to a predetermined position, said ram having a transverse opening and having a top with another opening communicating with said transverse opening, means including an electric circuit for firing said electrodes, a firing control switch in said circuit mounted on said ram, a lever arm pivoted to said ram and located in said transverse opening and having means positioned to actuate said switch upon pivotal movement of the lever arm relative to the ram, a ram actuator having a projecting rod, a relatively movable connection including energy-storing springs between said rod and ram for causing movement of said ram to a position where work is clamped between said electrodes, said springs being thereafter adapted to store energy upon further movement of said ram actuator past clamping position, and a pin depending from said ram through said top opening of the ram and engaging said lever arm in the transverse opening for moving the latter to switch actuating position during such further movement of the ram actuator.

4. In an electric welder having a first electrode and having a movably mounted upright welding ram carrying a second electrode which is positioned to co-operate with said first electrode upon movement of the ram to a predetermined position, said ram having a transverse opening and having a top with another opening communicating with said transverse opening, means including an electric circuit for firing said electrodes, a firing control switch in said circuit mounted on said ram, a lever arm pivoted to said ram and located in said transverse opening and having means positioned to actuate said switch upon pivotal movement of the lever arm relative to the ram, a ram actuator having a projecting rod, a relatively movable connection including energy-storing springs between said rod and ram for causing movement of said ram to a position where work is clamped between said electrodes, said springs being thereafter adapted to store energy upon further movement of said ram actuator past clamping position, a pin depending from said ram through said top opening of the ram and engaging said lever arm in the transverse opening for moving the latter to switch actuating position during such further movement of the ram actuator, and means on said pin engageable with said ram upon return movement of the ram actuator for causing return movement of said ram.

5. In an electric welder having a first electrode and having a movably mounted welding ram carrying a second electrode which is positioned to co-operate with said first electrode upon movement of the ram to a predetermined position, means including an electric circuit for firing said electrodes, a firing control switch in said circuit, a lever arm yieldingly pivoted to said ram and having means positioned to actuate said switch upon pivotal movement of the lever arm relative to said ram, means including a ram actuator for moving said welding ram to a position where work is clamped between said first and second electrodes, said means including a resilient device between said actuator and ram responsive to further movement of said actuator beyond said clamping position for storing up energy, and means between said actuator and lever arm for moving the latter to switch actuating position during such further movement of the actuator.

6. In an electric welder having a first electrode and having a movably mounted welding ram carrying a second electrode which is positioned to co-operate with said first electrode upon movement of the ram to a predetermined position, means including an electric circuit for firing said electrodes, a firing control switch in said circuit, a lever arm yieldingly pivoted to said ram and having adjustable means positioned to actuate said switch upon pivotal movement of the lever arm relative to said ram, means including a ram actuator for moving said welding ram to a position where work is clamped between said first and second electrodes, said means including a resilient device between said actuator and ram responsive to further movement of said actuator beyond said clamping position for storing up energy, and means between said actuator and lever arm for moving the latter to switch actuating position during such further movement of the actuator.

7. In an electric welder having a first electrode and having a movably mounted welding ram carrying a second electrode which is positioned to co-operate with said first electrode upon movement of the ram to a predetermined position, means including an electric circuit for firing said electrodes, a firing control switch in said circuit mounted on said ram, a lever arm pivoted to said ram and having means positioned to actuate said switch upon pivotal movement of the lever, a ram actuator having a projecting rod, a connection including energy-storing springs between said rod and ram for causing movement of said ram to a position where work is clamped between said electrodes, said springs being thereafter adapted to store energy upon further movement of said actuator past clamping position, and means connected to said actuator and engaging said lever arm for moving the latter to switch actuating position during such further movement of the actuator.

8. In an electric welder having a first electrode and having a movably mounted welding ram carrying a second electrode which is positioned to co-operate with said first electrode upon movement of the ram to a predetermined position, means including an electric circuit for firing said electrodes, a firing control switch in said circuit mounted on said ram, a lever arm pivoted to said ram and having means positioned to actuate said switch upon pivotal movement of the lever, an actuator having a projecting rod, a relatively movable connection including a stack of apertured spring washers between said rod and ram for causing movement of said ram to a position where work is clamped between said electrodes, said spring washers being thereafter adapted to store energy upon further movement of said ram actuator past clamping position, and a pin projecting from said actuator through the apertures of said washers and engaging said lever arm for moving the latter to switch actuating position during such further movement of the ram actuator.

9. In an electric welder having a first electrode and having a movably mounted welding ram carrying a second electrode which is positioned to co-operate with said first electrode upon movement of the ram to a predetermined position, means including an electric circuit for firing said electrodes, a firing control switch in said circuit mounted on said ram, a lever arm pivoted to said ram and having means positioned to actuate said switch upon pivotal movement of the lever, a ram actuator having a projecting rod, a connection including energy-storing springs between said rod and ram for causing movement of said ram to a position where work is clamped between said electrodes, said springs being thereafter adapted to store energy upon further movement of said ram actuator past clamping position and said springs having a central hole, and a pin projecting from said actuator through said central hole of the springs and engaging said lever arm for moving the latter to switch actuating position during such further movement of the ram actuator.

10. In an electric welder having a first electrode and having a movably mounted welding ram carrying a second electrode which is positioned to co-operate with said first electrode upon movement of the ram to a predetermined position, means including an electric circuit for firing said electrodes, a firing control switch in said circuit mounted on said ram, a lever arm pivoted to said ram and having means positioned to actuate said switch upon pivotal movement of the lever, a ram actuator having a projecting rod and having a sleeve surrounding a portion of said rod, energy-storing centrally apertured spring means between said sleeve and ram for causing movement of said ram to a position where work is clamped between said electrodes, said spring means being adapted to store energy upon further movement of said actuator, and said rod having an extension portion extending through said spring means and engaging said lever arm for moving the latter to switch actuating position during such further movement of the actuator, and means on said last-mentioned rod extension portion engageable with said ram upon return movement of the ram actuator for causing return movement of the ram.

References Cited in the file of this patent

UNITED STATES PATENTS

| | | |
|---|---|---|
| 1,174,446 | Rietzel | Mar. 7, 1916 |
| 1,779,365 | Von Henke | Oct. 21, 1930 |